US009797734B2

(12) United States Patent
Mizutani et al.

(10) Patent No.: US 9,797,734 B2
(45) Date of Patent: Oct. 24, 2017

(54) OBJECT RECOGNITION APPARATUS

(71) Applicant: HONDA MOTOR CO., LTD., Minato-Ku, Tokyo (JP)

(72) Inventors: Katsuya Mizutani, Wako (JP); Shinya Maruo, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 25 days.

(21) Appl. No.: 14/881,360

(22) Filed: Oct. 13, 2015

(65) Prior Publication Data
US 2016/0107643 A1 Apr. 21, 2016

(30) Foreign Application Priority Data

Oct. 15, 2014 (JP) ................................. 2014-210381

(51) Int. Cl.
*G01C 21/26* (2006.01)
*G01S 13/72* (2006.01)
*G01S 13/93* (2006.01)
*G06K 9/00* (2006.01)
*G01S 13/86* (2006.01)

(52) U.S. Cl.
CPC ............ *G01C 21/26* (2013.01); *G01S 13/726* (2013.01); *G01S 13/867* (2013.01); *G01S 13/931* (2013.01); *G06K 9/00805* (2013.01)

(58) Field of Classification Search
CPC ..... G01C 21/26; G01S 13/726; G01S 13/931; G01S 13/867; G06K 9/00805
See application file for complete search history.

(56) References Cited

U.S. PATENT DOCUMENTS 4,792,694 A * 12/1988 Shioya ............... H04N 13/0242
250/558
5,291,207 A * 3/1994 Kikuchi ................... B60T 7/22
342/125
5,473,538 A * 12/1995 Fujita ..................... B60K 28/10
342/70

(Continued)

FOREIGN PATENT DOCUMENTS

CN 101305295 A 11/2008
CN 103847667 A 6/2014

(Continued)

OTHER PUBLICATIONS

Search Report dated Aug. 16, 2016 issued over the corresponding German Patent Application No. 102015219780.8 with the English translation thereof.

(Continued)

*Primary Examiner* — Frederick Brushaber
(74) *Attorney, Agent, or Firm* — Carrier Blackman & Associates, P.C.; Joseph P. Carrier; Jeffrey T. Gedeon

(57) ABSTRACT

A sameness judgment unit of an object recognition apparatus sets a threshold value for a relative distance between the first object and the second object, for judging whether or not the first object and the second object are the same. If at least a portion of the first object exists on a travel path of a vehicle, and the second object exists outside of the travel path, the sameness judgment unit judges that the first object and the second object are different objects, even if the relative distance is less than or equal to the threshold value.

5 Claims, 6 Drawing Sheets

(56) References Cited

U.S. PATENT DOCUMENTS

| | | | | |
|---|---|---|---|---|
| 5,689,264 | A | * | 11/1997 | Ishikawa ............... G01S 17/936 342/70 |
| 6,021,375 | A | * | 2/2000 | Urai ..................... B60T 7/22 701/301 |
| 7,554,485 | B2 | * | 6/2009 | Jordan .................. G01S 7/411 342/70 |
| 7,777,669 | B2 | * | 8/2010 | Tokoro ................ B60R 21/0134 342/118 |
| 8,125,372 | B2 | * | 2/2012 | Focke .................... G01S 11/12 342/109 |
| 8,989,439 | B2 | * | 3/2015 | Kido .................. G06K 9/00825 382/103 |
| 9,623,869 | B2 | | 4/2017 | Matsuno |
| 2003/0004644 | A1 | * | 1/2003 | Farmer ................ B60W 30/16 701/301 |
| 2003/0174054 | A1 | * | 9/2003 | Shimomura ............ G01S 7/415 340/435 |
| 2003/0179129 | A1 | * | 9/2003 | Tamatsu .................. G01S 7/354 342/70 |
| 2003/0235327 | A1 | * | 12/2003 | Srinivasa ............. G06K 9/3241 382/104 |
| 2005/0093735 | A1 | * | 5/2005 | Samukawa ............... B60T 7/22 342/70 |
| 2007/0168128 | A1 | | 7/2007 | Tokoro et al. |
| 2008/0130954 | A1 | * | 6/2008 | Taniguchi .......... G06K 9/00805 382/104 |
| 2011/0050481 | A1 | * | 3/2011 | Itoh ....................... G01S 13/345 342/27 |
| 2014/0343750 | A1 | * | 11/2014 | Minemura ........... B60W 50/04 701/1 |

FOREIGN PATENT DOCUMENTS

| | | |
|---|---|---|
| DE | 19537129 A1 | 4/1996 |
| JP | 2005227947 | 8/2005 |
| JP | 2013114606 | 6/2013 |

OTHER PUBLICATIONS

Office Action dated Aug. 16, 2016 issued over the corresponding German Patent Application No. 102015219780.8 with the English translation thereof.

Office Action dated Jun. 7, 2016 issued over the corresponding Japanese Patent Application No. 2014-210381 with English translation of pertinent portion.

Office Action with Search Report dated May 17, 2017, issued in the corresponding Chinese patent application No. 201510666153.4 with the English translation thereof.

\* cited by examiner

OBJECT RECOGNITION APPARATUS

CROSS-REFERENCE TO RELATED APPLICATION

This application is based upon and claims the benefit of priority from Japanese Patent Application No. 2014-210381 filed on Oct. 15, 2014, the contents of which are incorporated herein by reference.

BACKGROUND OF THE INVENTION

Field of the Invention

The present invention relates to an object recognition apparatus for recognizing an object that exists in a direction of travel of a vehicle.

Description of the Related Art

With the system disclosed in U.S. Patent Application Publication No. 2007/0168128 (hereinafter referred to as "US2007/0168128A1"), an obstacle detection result performed by a millimeter wave radar, and an obstacle detection result performed by image recognition are referred to, and a branching operation is performed between a case in which both of the obstacle detection results are detected, and a case in which only one of the obstacle detection results is detected (abstract). In addition, by modifying initial conditions for a running support control corresponding to the branching result, a support control is implemented, which is responsive to the attention or inattention of the driver (abstract). In the event that an obstacle can be detected, respectively, by both millimeter wave radar and image recognition, there is a high possibility that the object has been detected correctly, and the running support control is implemented at a normal timing (paragraph [0083]).

In relation to the running support control, in the case it is determined from the position of an obstacle, speed information, and an estimated travel path of the vehicle that contact or collision between the vehicle itself and the obstacle is possible, using a non-illustrated display device or a speaker, a warning is issued to the driver by way of an image or voice output, so as to avoid contact or collision with the obstacle (paragraph [0063]).

Further, when it is determined that a collision with the obstacle cannot be avoided even if the operation for avoiding danger is performed, respective collision shock reducing means are controlled in order to perform a predetermined collision shock reducing operation. Thus, shocks due to a collision imparted to a passenger of the host vehicle, a pedestrian, and a passenger in the vehicle that collides with the host vehicle can be reduced (paragraph [0064]).

SUMMARY OF THE INVENTION

As described above, according to US2007/0168128A1, based on whether or not an obstacle can be detected, respectively, by radar and image recognition, the initial conditions for the running support control are modified (abstract). However, no investigations are conducted concerning cases in which the obstacle is mistakenly detected by the radar or through image recognition.

For example, in the case that the detection accuracy of the distance in the longitudinal (forward/rearward) direction by image recognition is lower in comparison with detection by radar, a discrepancy occurs between the detected position by way of image recognition and the detected position by way of radar. Further, with image recognition, although a sideways oriented vehicle can be detected by detecting the front and rear edges (left and right edges in the image) of the sideways oriented vehicle, in the case that such a detection is carried out, for example, it is possible for a mistaken detection of a sideways oriented vehicle to occur, by instead detecting the edges of white lines in the travel path (lane) or edges of columnar objects (poles, etc.) on the side of the road. If such a mistaken detection takes place, there is a concern that the running control may be operated excessively (refer to the later-described comparative example shown in FIG. 3), due to matching between the position of a columnar object on the side of the road detected by radar, and the position of a preceding vehicle detected by image recognition.

The aforementioned type of mistaken detection occurs not only in a configuration made up of a combined camera and a radar as object detection devices, but also in other configurations having a plurality of object detection devices.

The present invention has been devised taking into consideration the aforementioned problems, and has the object of providing an object recognition apparatus, which in a configuration having a plurality of object detection devices, is capable of performing recognition of objects, while considering that a mistaken detection may have occurred in any one of the object detection devices.

An object recognition apparatus according to the present invention includes a first object detector that detects a first object existing in a traveling direction of a vehicle, a second object detector that detects a second object existing in the traveling direction, and a sameness judgment unit for judging whether the first object and the second object are the same, by comparing a position of the first object and a position of the second object. The sameness judgment unit sets a threshold value for a relative distance between the first object and the second object, for judging whether or not the first object and the second object are the same, and if at least a portion of the first object exists on the travel path of the vehicle, and the second object exists outside of the travel path, the sameness judgment unit judges that the first object and the second object are different objects, even if the relative distance is less than or equal to the threshold value.

According to the present embodiment, if at least a portion of the first object, which is detected by the first object detector, exists on the travel path of the vehicle, and the second object, which is detected by the second object detector, exists outside of the travel path, the first object and the second object are judged to be different objects, even if the relative distance between the first and second objects is less than or equal to the threshold value. Consequently, even if the first object detector mistakenly detects the position of the first object, operation of an excessive traveling control based on the mistaken detection result can be prevented.

If the first object detector has detected at least a portion of the first object on the travel path, and the second object outside of the travel path and the second object on the travel path, for which the relative distances thereof, respectively, with the first object are less than or equal to the threshold value, are detected, the sameness judgment unit may carry out a traveling control with respect to the second object on the travel path, even if the relative distance of the second object outside of the travel path is shorter than that of the second object on the travel path.

In accordance with the above feature, even if the relative distance of the second object outside of the travel path is shorter than that of the second object on the travel path, the traveling control is performed with respect to the second object on the travel path. Consequently, even if the first object detector mistakenly detects the position of the first object, the traveling control can appropriately be carried out with respect to the second object on the travel path, which lies within a predetermined distance with respect to the first object.

If the first object detector has detected at least a portion of the first object on the travel path, and the second object detector has detected the second object outside of the travel path, for which the relative distance thereof with the first object is less than or equal to the threshold value, and the second object on the travel path, for which the relative distance with the first object is not less than or equal to the threshold value, the sameness judgment unit may carry out a traveling control with respect to the second object on the travel path.

In accordance with the above feature, even if the second object outside of the travel path is in the vicinity of the first object, at least a portion of which exists on the travel path, the traveling control is still performed with respect to the second object on the travel path. Consequently, even if the first object detector mistakenly detects the position of the first object, the traveling control can appropriately be carried out with respect to the second object on the travel path, which lies outside of the predetermined distance with respect to the first object.

Alternatively, if the first object detector has detected at least a portion of the first object on the travel path, and the second object outside of the travel path and the second object on the travel path, for which the relative distances thereof, respectively, with the first object are less than or equal to the threshold value, are detected, the sameness judgment unit may determine that the first object and the second object on the travel path are the same, even if the relative distance of the second object outside of the travel path is shorter than that of the second object on the travel path.

In accordance with the above feature, even if the relative distance of the second object outside of the travel path is shorter than that of the second object on the travel path, it is judged that the first object and the second object on the travel path are the same. Consequently, even if the first object detector mistakenly detects the position of the first object, the traveling control can appropriately be carried out using the information of the second object on the travel path, which resides within a predetermined distance with respect to the first object.

If the first object detector has detected at least a portion of the first object on the travel path, and the second object detector has detected the second object outside of the travel path, for which the relative distance thereof with the first object is less than or equal to the threshold value, and the second object on the travel path, for which the relative distance with the first object is not less than or equal to the threshold value, the sameness judgment unit may determine that the first object and the second object on the travel path are the same.

In accordance with the above feature, even if the second object outside of the travel path is in the vicinity of the first object, at least a portion of which exists on the travel path, it is still determined that the first object and the second object on the travel path are the same. Consequently, even if the first object detector mistakenly detects the position of the first object, the traveling control can appropriately be carried out using the information of the second object on the travel path, which resides outside of a predetermined distance with respect to the first object.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A. First Embodiment

A1. Configuration
[A1-1. Overall Configuration]

Figure 1:
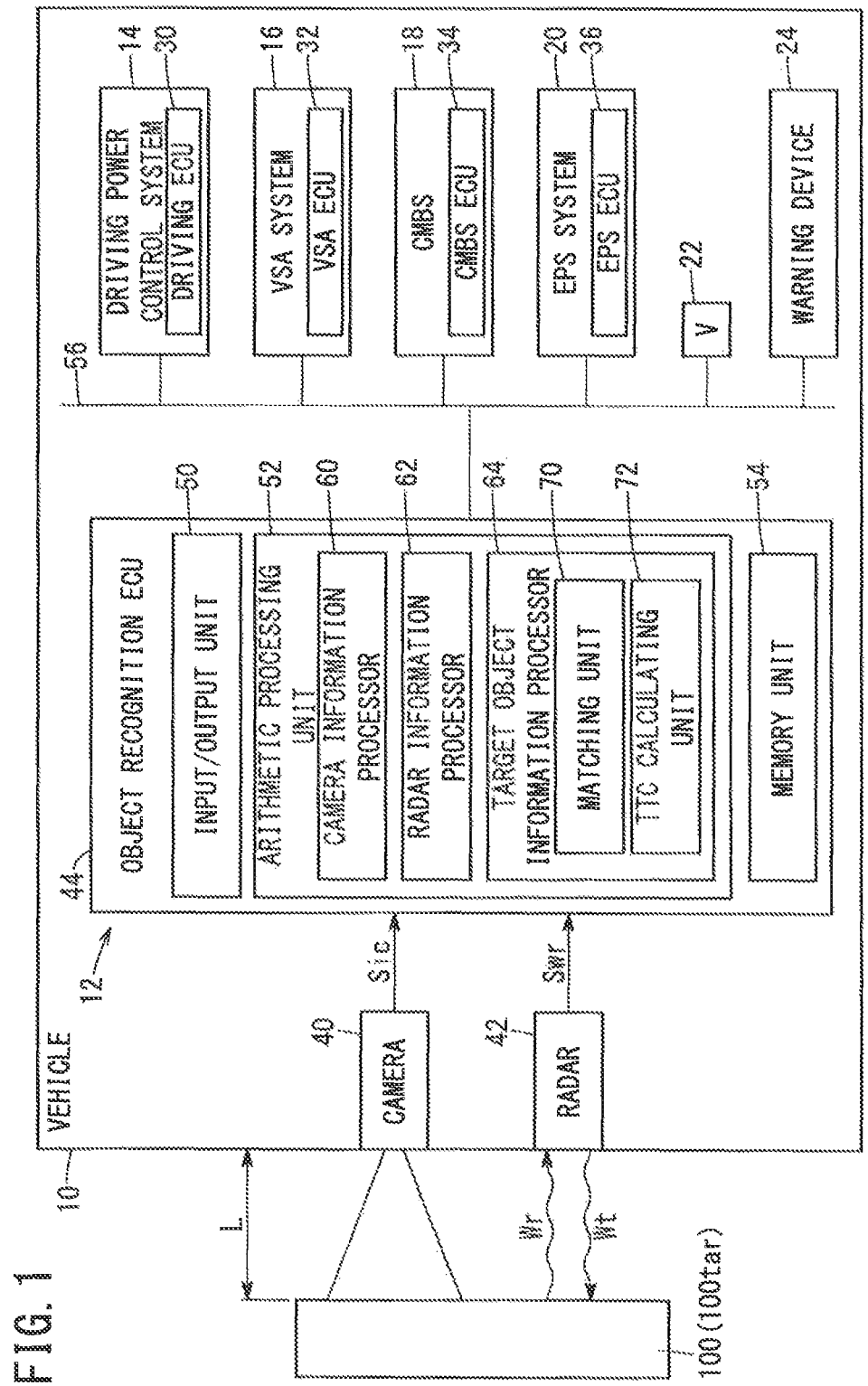
FIG. 1 is a block diagram showing the configuration of a vehicle in which an object recognition apparatus according to a first embodiment of the present invention is incorporated.

FIG. 1 is a block diagram showing the configuration of a vehicle 10 (hereinafter also referred to as a user's own vehicle or a "host vehicle 10") in which an object recognition apparatus 12 according to a first embodiment of the present invention is incorporated. The vehicle 10, in addition to the object recognition apparatus 12, includes a driving power control system 14, a vehicle stability assist system 16 (hereinafter referred to as a "VSA system 16"), a collision mitigation brake system 18 (hereinafter referred to as a "CMBS 18"), an electric power steering system 20 (hereinafter referred to as an "EPS system 20"), a vehicle speed sensor 22, and a warning device 24.

The object recognition apparatus 12 detects various types of peripheral objects 100 (e.g., other vehicles 102 (see FIG. 3), and non-illustrated pedestrians and walls, etc.) that appear around the periphery of the host vehicle 10. In addition, among such peripheral objects 100 (hereinafter also referred to as "detection objects 100"), the object recognition apparatus 12 selects and identifies as a target object 100tar an object that serves in relation to (i.e., as a basis for) controlling the host vehicle 10. The object recognition apparatus 12 calculates a distance L from the host vehicle 10 to the target object 100tar, together with determining attributes Prtar of the target object 100tar. In this regard, as such attributes Prtar, for example, there may be included the type Ca (e.g., vehicle, pedestrian (person), or wall) of the target object 100tar.

An electronic control unit 30 (hereinafter referred to as a "driving ECU 30" or an "ECU 30") of the driving power control system 14 implements a driving power control for the vehicle 10. When the driving power control is carried out, the driving ECU 30 controls the driving power of the vehicle 10 through control of a non-illustrated engine or the like. In the driving power control according to the first embodiment, an automatic cruise control is included. The automatic cruise control serves to control running or traveling of the vehicle 10 so that the vehicle velocity V [km/h] matches with a target velocity Vtar.

An electronic control unit 32 (hereinafter referred to as a "VSA ECU 32" or an "ECU 32") of the VSA system 16 implements a vehicle stability assist control. When the vehicle stability assist control is carried out, the VSA ECU 32, through control of a non-illustrated brake system or the like, stabilizes the behavior of the vehicle 10 when another vehicle 102 comes in proximity to or approaches the host vehicle 10 during turning along a curved road.

An electronic control unit 34 (hereinafter referred to as a "CMBS ECU 34" or an "ECU 34") of the CMBS 18 implements a collision mitigation brake control. When the collision mitigation brake control is carried out, the CMBS ECU 34, through control of the brake system or the like, controls automatic braking at a time that a detection object 100 comes in proximity to or approaches with respect to the host vehicle 10.

An electronic control unit 36 (hereinafter referred to as an "EPS ECU 36" or an "ECU 36") of the EPS system 20 implements a steering assistance control process. When the steering assistance control process is performed, the EPS ECU 36 serves to perform a steering assistance control process. In doing so, the EPS ECU 36 controls constituent components (an electric motor, a torque sensor, and a steering angle sensor, etc., none of which are shown) of an electric power steering apparatus to assist the driver in steering the vehicle 10.

The vehicle speed sensor 22 detects the velocity V of the vehicle 10 and outputs the detected velocity to the object recognition apparatus 12, etc. The warning device 24 carries out a warning (i.e., issues an alarm or the like) with respect to the driver, based on a command from the object recognition apparatus 12. The warning device 24 may include, for example, a non-illustrated display device and a speaker.

[A1-2. Object Recognition Apparatus 12]

As shown in FIG. 1, the object recognition apparatus 12 includes a camera 40, a radar system 42, and an object recognition electronic control unit 44 (hereinafter referred to as an "object recognition ECU 44" or an "ECU 44").

(A1-2-1. Camera 40)

The camera 40 (image capturing means) acquires an image Imc (hereinafter also referred to as a "peripheral image Imc" or a "captured image Imc") around the periphery of the vehicle 10 (including the target object 100tar). In addition, a signal corresponding to the image Imc (hereinafter referred to as an "image signal Sic" or a "signal Sic") is output to the ECU 44. Hereinafter, the detection object 100 that is detected by the camera 40 may also be referred to as a "first object 100c" or a "camera target object 100c".

Although only one camera 40 is used in the present embodiment, a stereo camera system may be constituted from two cameras 40 arranged with bilateral symmetry. The camera 40 captures images Imc at a rate of fifteen frames or more (for example, thirty frames) per second. Although the camera 40 is a monochrome (black and white) camera that makes use of light having wavelengths primarily in the visible light range, a color camera or an infrared camera may also be used. The camera 40, for example, is disposed in a central part in a widthwise direction of the vehicle, on a front portion (e.g., in the vicinity of the rearview mirror) in the passenger compartment of the vehicle 10. Alternatively, the camera 40 may be disposed in a central part in the widthwise direction on the front bumper of the vehicle 10.

(A1-2-2. Radar System 42)

The radar system 42 outputs to the exterior of the vehicle 10 transmitted waves Wt, which are electromagnetic waves (in the present case, millimeter waves), and receives reflected waves Wr, which are reflected by the detection object 100 (e.g., another vehicle 102 or a non-illustrated pedestrian (FIG. 3)) from among the transmitted waves Wt, and are returned back to the radar system 42. In addition, a detection signal corresponding to the reflected waves Wr (hereinafter referred to as a "reflected wave signal Swr" or a "signal Swr") is output to the ECU 44. Hereinafter, the detection object 100 that is detected by the radar system 42 may also be referred to as a "second object 100r" or a "radar target object 100r".

The radar system 42 is arranged on a frontward side (e.g., the front bumper and/or the front grill) of the vehicle 10. In addition to or in place of the frontward side, the radar system 42 may be arranged on a rearward side (e.g., the rear bumper and/or the rear grill) or on a side (e.g., a side of the front bumper) of the vehicle 10.

Further, as will be described later, in place of the radar system 42, which outputs millimeter waves, a laser radar system, or a sensor such as an ultrasonic wave sensor or the like can be used.

(A1-2-3. Object Recognition ECU 44)

The object recognition ECU 44 serves to control the object recognition apparatus 12 in its entirety, and as shown in FIG. 1, includes an input/output unit 50, an arithmetic processing unit 52, and a memory unit 54.

Reflected wave signals Swr from the radar system 42 and image signals Sic from the camera 40 are supplied to the object recognition ECU 44 through the input/output unit 50. Further, communications between the object recognition ECU 44 and the driving ECU 30, the VSA ECU 32, the CMBS ECU 34, and the EPS ECU 36 are carried out through the input/output unit 50 and a communication line 56. The input/output unit 50 is equipped with a non-illustrated A/D converter for converting input analog signals into digital signals.

The arithmetic processing unit 52 performs calculations based on the respective signals Swr, Sic from the radar system 42 and the camera 40, and based on the results of such calculations, generates signals that are supplied respectively to the driving ECU 30, the VSA ECU 32, the CMBS ECU 34, and the EPS ECU 36.

As shown in FIG. 1, the arithmetic processing unit 52 includes a camera information processor 60, a radar information processor 62, and a target object information processor 64. Each of the processors 60, 62, 64 is realized by executing programs that are stored in the memory unit 54. Such programs may be supplied externally through a non-illustrated wireless communications device (e.g., a mobile phone, a smart phone, or the like). Further, portions of the programs can also be constituted as hardware (circuit elements).

The camera information processor 60 calculates information (hereinafter referred to as "camera information Ic", "first object information Ic", or "information Ic") concerning the detection object 100 (first object 100c), based on the peripheral image Imc acquired by the camera 40. In the first embodiment, in the case that a sideways oriented vehicle (not shown) is detected, the camera information processor 60 detects the sideways oriented vehicle based on a front edge and a rear edge (left and right edges in the peripheral image Imc) of the sideways oriented vehicle. Alternatively, in addition to or instead of using at least one of the front edge and the rear edge, the sideways oriented vehicle may be detected using another portion (for example, a vehicle wheel).

The radar information processor 62 calculates information (hereinafter referred to as "radar information Ir", "second object information Ir" or "information Ir") concerning the detection object 100 (second object 100*r*), based on the reflected waves Wr (reflected wave signals Swr) detected by the radar system 42.

The target object information processor 64 (hereinafter also referred to as a "processor 64") calculates information for the purpose of driving support, utilizing the camera information Ic calculated by the camera information processor 60, and the radar information Ir calculated by the radar information processor 62. As shown in FIG. 1, the processor 64 comprises a matching unit 70 and a TTC calculation unit 72 (hereinafter also referred to as a "calculation unit 72").

The matching unit 70 calculates combined information (hereinafter referred to as "target object information It" or "information It") made up from a combination of the camera information Ic calculated by the camera information processor 60, and the radar information Ir calculated by the radar information processor 62. Stated otherwise, the processor 64 performs so-called fusion processing. The information It is information concerning the target object 100*tar*, which is identified based on the detection object 100 (first object 100*c*) detected by the camera 40, and the detection object 100 (second object 100*r*) detected by the radar system 42.

The TTC calculation unit 72 calculates a TTC (Time to Collision) indicating an amount of time until the host vehicle 10 will come into contact (or collide) with the target object 100*tar*.

The memory unit 54 is constituted from a RAM (Random Access Memory), which stores image signals that have been converted into digital signals, and temporary data or the like that is subjected to various types of operations or arithmetic processes, and a ROM (Read Only Memory), which stores executable programs, tables, maps, etc.

A2. Driving Support Control

[A2-1. Overall Flow of Driving Support Control Process]

Figure 2:
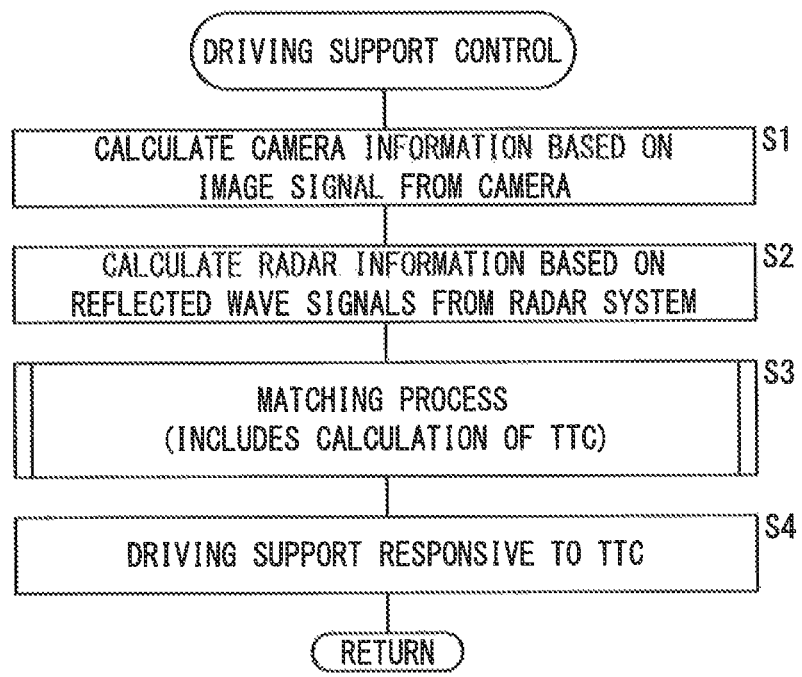
FIG. 2 is a flowchart of a driving support control process performed in the first embodiment.

FIG. 2 is a flowchart of a driving support control process performed in the first embodiment. The driving support control process is executed by the arithmetic processing unit 52 (the processors 60, 62, 64) of the object recognition ECU 44, and arithmetic processing units (not shown) of the ECUs 30, 32, 34, and 36. The processes shown in FIG. 2 of each of the respective ECUs 30, 32, 34, 36, and 44 are repeated at predetermined calculation cycles (for example, at cycles of any one of a few μsec to a few hundred msec).

In step S1, based on the image signals Sic (captured image Imc) from the camera 40, the ECU 44 (camera information processor 60) calculates the camera information Ic of the detection object 100 (camera target object 100*c*). In the camera information Ic, there are included the position Poc, the velocity Vlc in the lateral direction, the acceleration ac, and attributes Prc, etc., of the camera target object 100*c*.

The position Poc of the first embodiment, for example, indicates a central position of the camera target object 100*c*, although the position Poc may indicate another position (e.g., a center of gravity). Hereinafter, the position Poc may also be referred to as a central position Poc. Further, as attributes Prc, there are included the type Ca (pedestrian, vehicle, etc.), size, etc., of the camera target object 100*c*. Further, in the case that multiple camera target objects 100*c* exist within the captured image Imc, the ECU 44 calculates the position Poc, the velocity Vlc in the lateral direction, the acceleration ac, and the attributes Prc, etc., of each of the camera target objects 100*c*.

In step S2, based on the reflected wave signals Swr from the radar system 42, the ECU 44 (radar information processor 62) calculates the radar information Ir of the detection object 100 (radar target object 100*r*). In the radar information Ir, there are included the position Por, velocity Vr, and acceleration ar, etc., of the radar target object 100*r*. The position Por of the first embodiment, for example, indicates a central position of the radar target object 100*r*, although the position Por may indicate another position (e.g., a center of gravity). Hereinafter, the position Por may also be referred to as a central position Por. Further, in the case that plural radar target objects 100*r* exist within the detection region of the radar system 42, the ECU 44 calculates the position Por, the velocity Vr, and the acceleration ar, etc., with respect to each of the radar target objects 100*r*.

In step S3, the ECU 44 (matching unit 70) performs a matching process to implement matching between the camera information Ic (camera target object 100*c*) and the radar information Ir (radar target object 100*r*). In the matching process, it is determined that the first object 100*c* and the second object 100*r* are the same target object 100*tar*, when the position Poc of the first object 100*c* recognized by the camera information processor 60, and the position Por of the second object 100*r* recognized by the radar information processing unit 62 coincide or reside within a predetermined distance Lx from each other. Stated otherwise, it is judged whether or not a relative distance Dx between the position Poc of the camera target object 100*c* and the position Por of the radar target object 100*r* lies within the threshold value Lx. In addition, the ECU 44 (TTC calculation unit 72) calculates the TTC, which indicates the amount of time until the host vehicle 10 will come into contact (or collide) with the target object 100*tar*.

In step S4, the ECUs 44, 30, 32, 34, and 36 carry out driving support corresponding to the TTC. For example, using the TTC, the ECU 30 executes an automatic cruise control. For example, in the case that another vehicle 102 (hereinafter referred to as a "preceding vehicle 102") as a vehicle driving in front of the host vehicle 10 exists in the same lane 110 (FIG. 3) as the host vehicle 10, using the TTC, contact with the preceding vehicle 102 is avoided, while the host vehicle is made to travel so that the velocity V thereof matches with the target velocity Vtar.

Using the TTC, the VSA ECU 32 implements the vehicle stability assist control. Using the TTC, the CMBS ECU 34 implements the collision mitigation brake control. Further, using the TTC, the EPS ECU 36 implements the steering assist control process. Through the warning device 24, the object recognition ECU 44 issues a predetermined warning (e.g., outputs a warning sound or a warning display) responsive to the TTC.

[A2-2. Matching Process]

(A2-2-1. Concept of Matching Process)

As described above, according to the first embodiment, the target object 100*tar* is identified by matching (linkage) between the camera target object 100*c* and the radar target object 100*r*. In the first embodiment, such matching is performed so that mistaken detection by the camera 40 and the radar system 42 is prevented.

Figure 3:
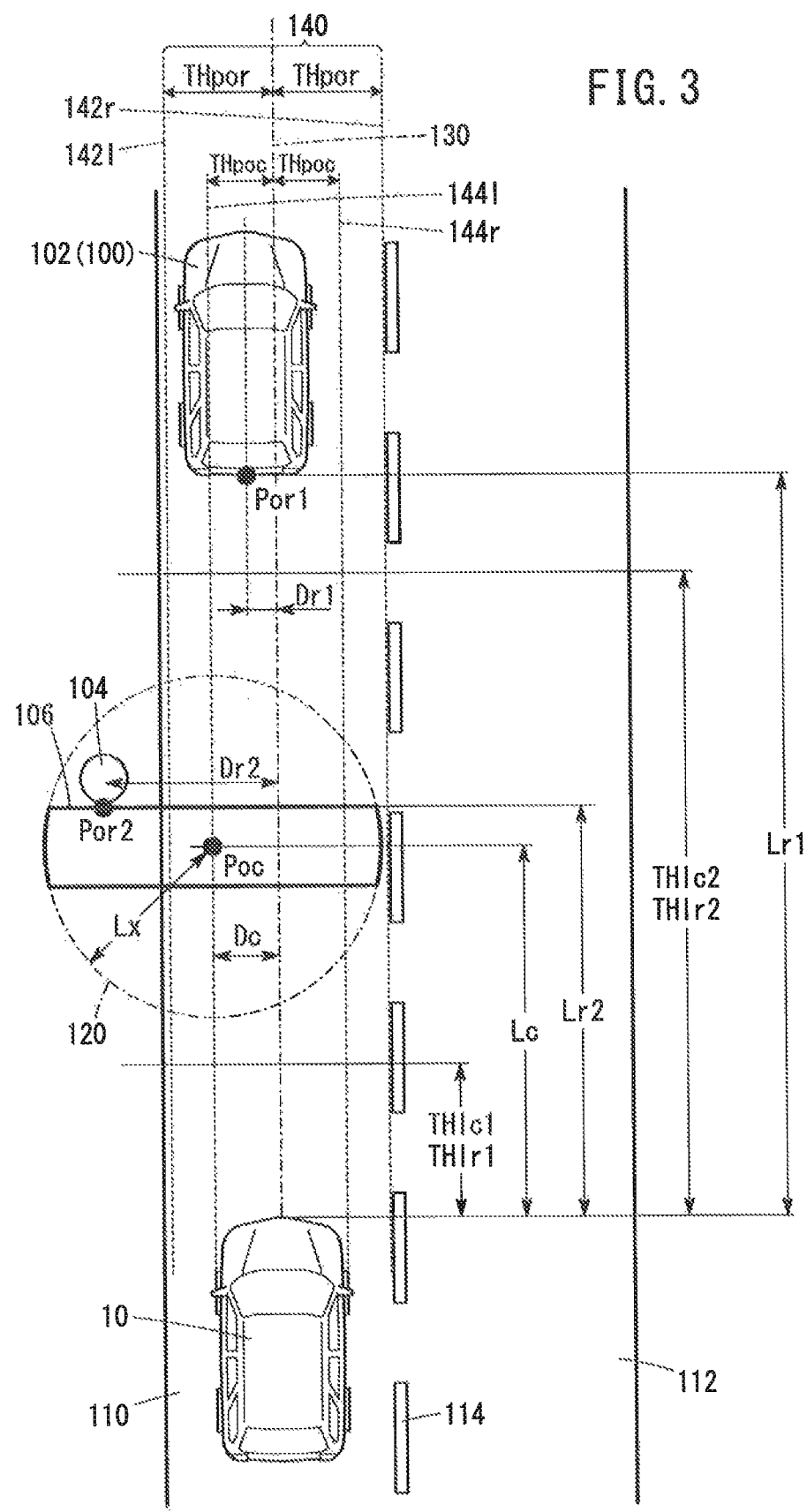
FIG. 3 is a descriptive drawing for explaining a matching process as a comparative example including a problem to be solved in the first embodiment, together with a matching process according to the first embodiment.

FIG. 3 is a descriptive drawing for explaining a matching process as a comparative example including a problem to be solved in the first embodiment, together with a matching process according to the first embodiment. As shown in FIG. 3, the preceding vehicle 102 (detection object 100) exists in front of the host vehicle 10, together with a pole 104 that exists along the side of the road.

In FIG. 3, a point Por1 indicates the position of the preceding vehicle 102 as a radar target object 100r, which is detected by the radar information processor 62 based on an output (the reflected wave signals Swr) from the radar system 42. A point Por2 indicates the position of the pole 104 as a radar target object 100r, which is detected by the radar system 42. Hereinafter, the points Por1, Por2 may also be referred to as positions Por1, Por2. As understood from FIG. 3, the positions Por1, Por2 are detected relatively accurately.

The frame 106 in FIG. 3 indicates the position of a sideways oriented vehicle (in FIG. 3, such a vehicle is not actually present) as a camera target object 100c, which is "mistakenly detected" by the camera information processor 60 based on an output (the image signal Sic) from the camera 40. Further, the point Poc indicates a central position of the sideways oriented vehicle that was detected. Hereinafter, the point Poc may also be referred to as a position Poc.

As described above, the camera information processor 60 of the first embodiment detects the sideways oriented vehicle based on a front edge and a rear edge thereof. In the example of FIG. 3, the processor 60 mistakenly detects a sideways oriented vehicle based on a vertical edge of the pole 104, and an edge of a white line 114 that separates or partitions the lanes 110, 112.

In addition, the matching unit 70 of the object recognition ECU 44 detects the position Por2 of the pole 104 as a radar target object 100r that exists within a predetermined distance Lx from the position Poc of the mistakenly detected sideways oriented vehicle as a camera target object 100c. Further, the matching unit 70 carries out matching between the camera target object 100c and the radar target object 100r, based on the position Poc and the position Por2. Up to this point, the same processing is performed by both the matching processes in the comparative example and in the first embodiment.

With the matching process of the comparative example, a matching result is used, which is based on the position Poc and the position Por2. Such a result leads to the TTC being calculated in relation to presence of a sideways oriented vehicle which does not actually exist, and thus an unnecessary (or excessive) driving support is carried out. On the other hand, with the matching process of the first embodiment, the matching result based on the position Poc and the position Por2 is not used. Instead, with the target object information processor 64 (matching unit 70) of the first embodiment, driving support is carried out based on the position (Por1) of the actually existing preceding vehicle 102 (specific details thereof will be described later using FIGS. 4 and 5). Owing to this feature, the implementation of an unnecessary driving support can be avoided.

(A2-2-2. Details of Matching Process of the First Embodiment)

Figure 4:
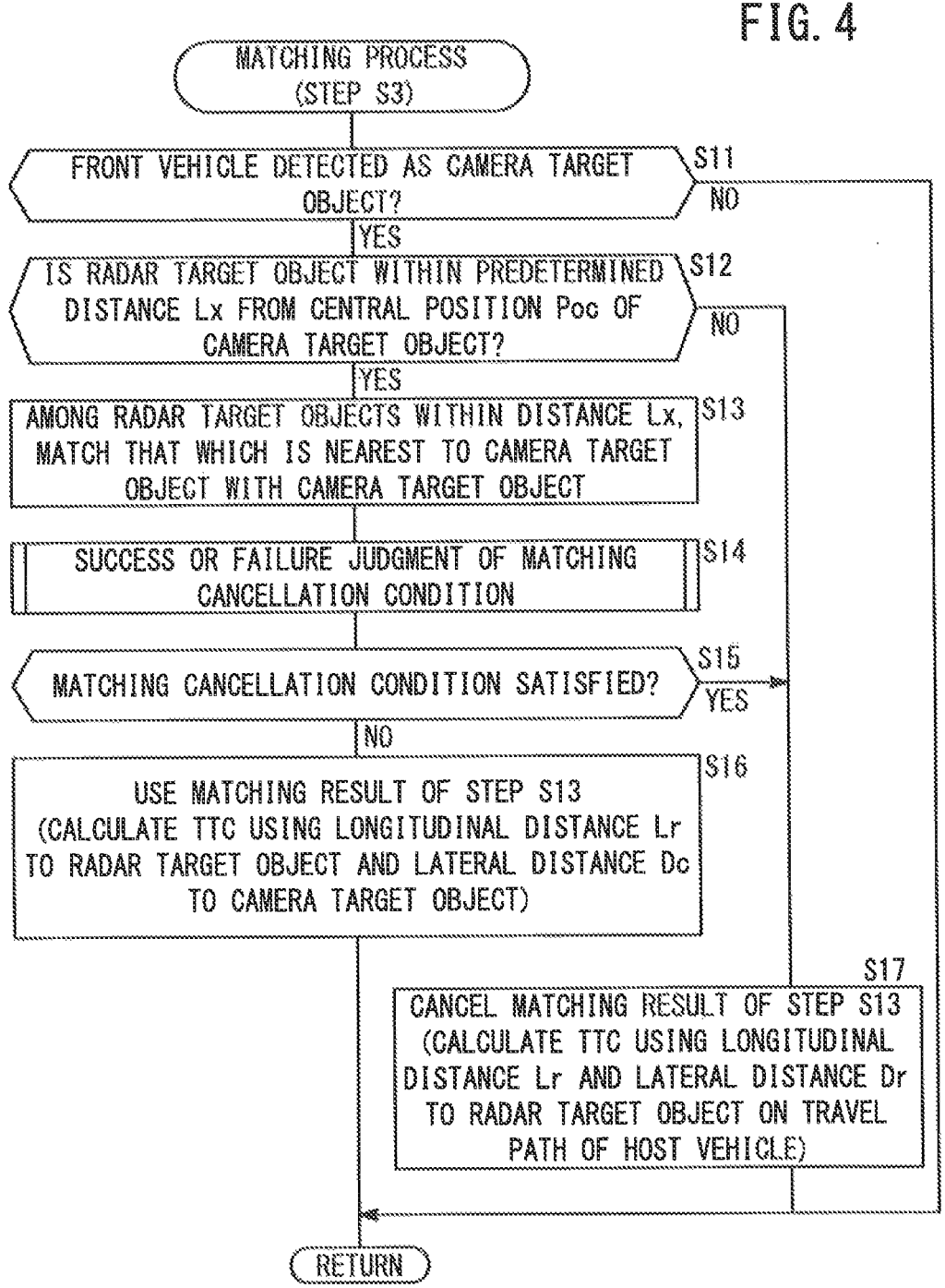
FIG. 4 is a flowchart (details of step S3 of FIG. 2) of the matching process according to the first embodiment.

FIG. 4 is a flowchart (details of step S3 of FIG. 2) of the matching process according to the first embodiment. In step S11, the object recognition ECU 44 (camera information processor 60) determines whether or not a front vehicle (vehicle in front) has been detected as the camera target object 100c. The front vehicle referred to above includes both a preceding vehicle (a vehicle that is being driven in the travel lane 110 of the host vehicle 10) and a sideways oriented vehicle (a vehicle that enters into the traveling lane 110 or is proceeding out from the traveling lane 110 of the host vehicle 10). Furthermore, an oncoming vehicle (a vehicle that is traveling in the opposing lane 112 to the host vehicle 10) may be included in the definition of front vehicle.

If a front vehicle is detected as a camera target object 100c (step S11: YES), the process proceeds to step S12. If a front vehicle is not detected as a camera target object 100c (step S11: NO), then the current process is terminated.

In step S12, the ECU 44 judges whether or not the radar target object 100r exists within the predetermined distance Lx from the position Poc of the detected camera target object 100c (see a circle 120 in FIG. 3). If the radar target object 100r exists within the predetermined distance Lx from the position Poc of the detected camera target object 100c (step S12: YES), the process proceeds to step S13.

In step S13, the ECU 44 matches the camera target object 100c with one that is nearest to the camera target object 100c among the radar target objects 100r that lie within the predetermined distance Lx. In the example of FIG. 3, since there is only the radar target object 100r of position Por2 as the radar target object 100r that lies within the predetermined distance Lx, the radar target object 100r of position Por2 is matched with the camera target object 100c of position Poc.

In the following step S14, the ECU 44 determines the success or failure of a matching cancellation condition. The matching cancellation condition referred to above is a condition that corresponds to the case of mistaken detection, as was described above with reference to FIG. 3. Further details of step S14 will be described below with reference to FIG. 5.

In step S15, The ECU 44 determines whether or not the matching cancellation condition has been satisfied. In the case that the matching cancellation condition is not satisfied (step S15: NO), then in step S16, the ECU 44 makes use of the matching result of step S13 without modification. In addition, using the longitudinal distance Lr from the host vehicle 10 up to the radar target object 100r, and the lateral distance Dc from the host vehicle 10 up to the camera target object 100c, the ECU 44 calculates the TTC. More specifically, by identifying the movement velocity and the movement direction of the target object 100tar based on the longitudinal distance Lr and the lateral distance Dc, the ECU 44 calculates the time until the target object 100tar will come into contact with the host vehicle 10.

According to the first embodiment, although the distance in the longitudinal direction from the front end of the host vehicle 10 up to the position Por of the radar target object 100r is defined as the longitudinal distance Lr, the position of the host vehicle 10 that serves as a standard for the longitudinal distance Lr may be a different position. In the example of FIG. 3, the longitudinal distance Lr up to the radar target object 100r (other vehicle 102) at the position Por1 is indicated by Lr1, whereas the longitudinal distance Lr up to the radar target object 100r (pole 104) at the position Por2 is indicated by Lr2.

Further, according to the first embodiment, although the distance in the lateral direction from a central locus 130 of the host vehicle 10 up to the position Por of the radar target object 100r is defined as the lateral distance Dc, the position of the host vehicle 10 that serves as a standard for the lateral distance Dc may be a different position. In addition, the central locus 130, when the host vehicle 10 is traveling, is a locus through which it is expected that the center of the host vehicle 10 in a lateral direction (vehicle widthwise direction) will pass through. The ECU 44 calculates the central locus 130 based on information of the travel lane 110, etc., which is detected by the camera information processor 60.

If the matching cancellation condition is satisfied (step S15: YES), or if the radar target object 100r does not reside within the predetermined distance Lx from the position Poc of the camera target object 100c in step S12 (S12: NO), the process proceeds to step S17.

In step S17, the ECU 44 cancels the matching result determined in step S13. In addition, using the longitudinal distance Lr and the lateral distance Dr to the radar target object 100r on the travel path 140 of the host vehicle 10, the ECU 44 calculates the TTC. More specifically, by identifying the movement velocity and the movement direction of the target object 100tar based on the longitudinal distance Lr and the lateral distance Dr, the ECU 44 calculates the time until the target object 100tar will come into contact with the host vehicle 10.

As described above, the longitudinal distance Lr is a distance in the longitudinal direction from the host vehicle 10 up to the radar target object 100r. Further, the lateral distance Dr is a distance in the lateral direction (vehicle widthwise direction) from the central locus 130 of the host vehicle 10 to the radar target object 100r. In the example of FIG. 3, the lateral distance Dr up to the radar target object 100r (other vehicle 102) at the position Por1 is indicated by Dr1, whereas the lateral distance Dr up to the radar target object 100r (pole 104) at the position Por2 is indicated by Dr2.

Further, in the first embodiment, the travel path 140 of the host vehicle 10 corresponds to an imaginary lane made up from an average width that the travel lane 110 of the host vehicle 10 can assume. The travel path 140 is defined within a range of a threshold value –THpor to a threshold value THpor in the lateral direction (vehicle widthwise direction) about the central locus 130 of the host vehicle 10. The threshold value THpor, for example, is a value of between 1.5 and 2.0 m. The lines 1421, 142r in FIG. 3 are virtual lines indicative of the range of between the threshold value –THpor and the threshold value THpor.

Alternatively, the travel path 140 can be defined by the traveling lane 110 of the host vehicle 10 itself. In this case, the travel path 140 can be specified based on the image Imc from the camera 40. According to the first embodiment, for the radar target object 100r on the travel path 140, there may be included both an object within the predetermined distance Lx and an object outside of the predetermined distance Lx from the central position Poc of the camera target object 100c.

(A2-2-3. Determination of Success or Failure of Matching Cancellation Condition)

Figure 5:
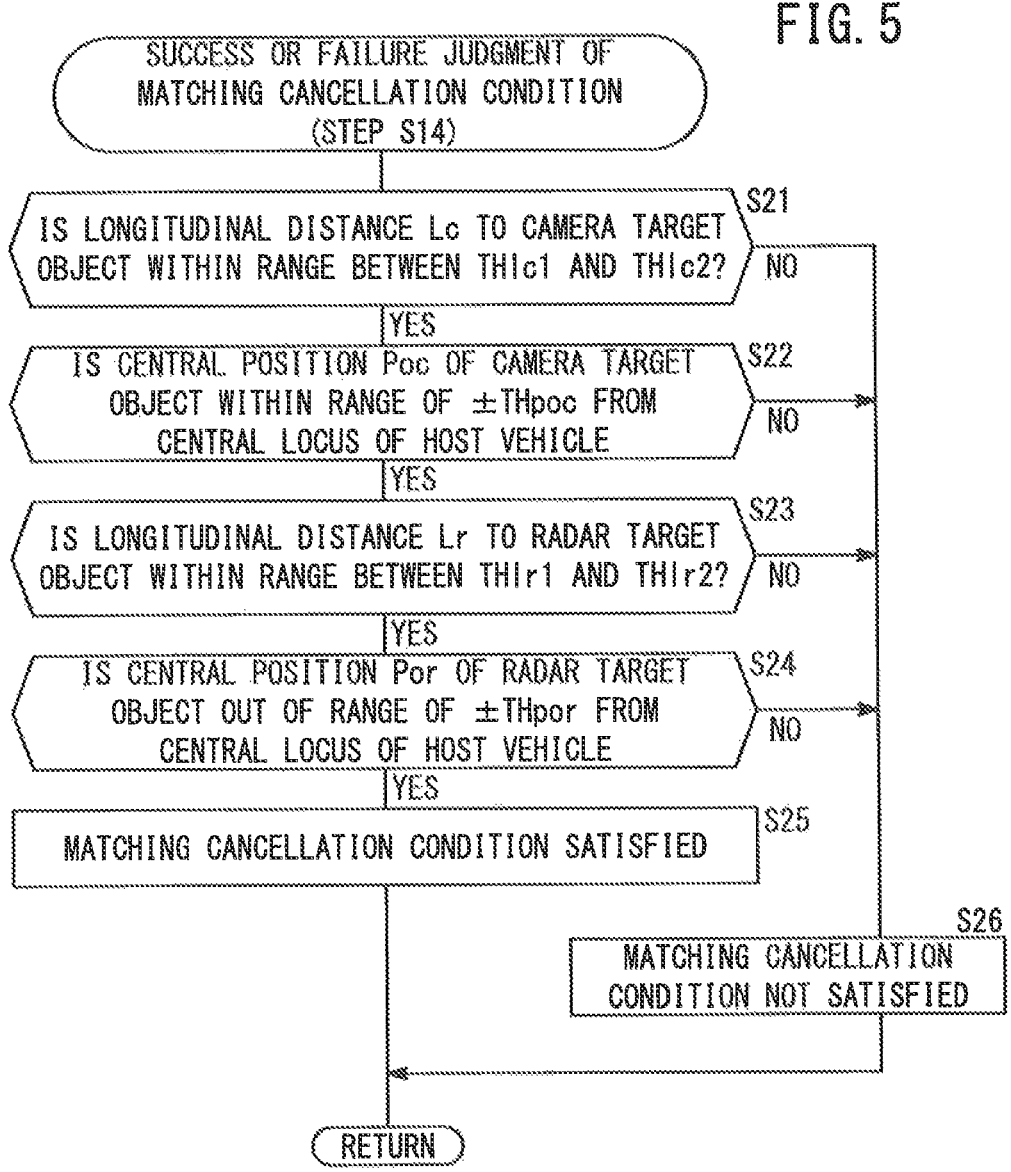
FIG. 5 is a flowchart (details of step S14 of FIG. 4) of a success or failure judgment of a matching cancellation condition according to the first embodiment.

FIG. 5 is a flowchart (details of step S14 of FIG. 4) of a success or failure judgment of the matching cancellation condition according to the first embodiment. In step S21, the ECU 44 judges whether or not the longitudinal distance Lc to the camera target object 100c resides within the range of between the threshold values THlc1 and THlc2. The threshold value THlc1 is indicative of a minimum value of the distance Lc for performing matching cancellation and, for example, is a value of between 5 and 15 m. The threshold value THlc2 is indicative of a maximum value of the distance Lc for performing matching cancellation and, for example, is a value of between 20 and 50 m.

If the longitudinal distance Lc lies within the range of between the threshold values THlc1 and THlc2 (step S21: YES), then in step S22, the ECU 44 determines whether or not the central position Poc of the camera target object 100c lies within a range from the central locus 130 of the host vehicle 10 to the threshold values –THpoc to THpoc. The threshold value ±THpoc is a threshold value for the purpose of determining whether or not at least a portion of the camera target object 100c exists on the travel path 140. The threshold value THpoc, for example, is a value of between 0.8 and 1.1 m. As a result of this feature, it is possible to determine if at least a portion of the camera target object 100c is on the travel path 140 (for example, due to on-street parking or the like, the camera target object 100c spans over an area on the travel path 140 and outside of the travel path 140). The lines 1441, 144r in FIG. 3 are virtual lines indicative of the range of between the threshold value –THpoc and the threshold value THpoc.

If the central position Poc lies within the range from the central locus 130 to the threshold values –THpoc to THpoc (step S22: YES), then in step S23, the ECU 44 determines whether or not the longitudinal distance Lr to the radar target object 100r lies within the range of between the threshold values –THlr1 and THlr2. The threshold value THlr1 is indicative of a minimum value of the distance Lr for performing matching cancellation and, for example, is a value of between 5 and 15 m. The threshold value THlr2 is indicative of a maximum value of the distance Lr for performing matching cancellation and, for example, is a value of between 20 and 50 m. In the first embodiment, the threshold values THlr1, THlr2 are equal to the threshold values THlc1, THlc2.

If the longitudinal distance Lr lies within the range of between the threshold values THlr1 and THlr2 (step S23: YES), then in step S24, the ECU 44 determines whether or not the central position Por of the radar target object 100r lies outside of a range from the central locus 130 of the host vehicle 10 to the threshold values –THpor to THpor. As has been described above in relation to step S17 in FIG. 4, the threshold value ±THpor is a value for the purpose of identifying the travel path 140 of the host vehicle 10. According to the determination of step S24, it is possible to determine that the radar target object 100r is outside of the travel path 140.

If the central position Por of a radar target object 100r lies outside of the range from the central locus 130 to the threshold values –THpor to THpor (step S24: YES), then in step S25, the ECU 44 determines that the matching cancellation condition has been satisfied.

If the result of any one of steps S21 through S24 is NO, then in step S26, the ECU 44 determines that the matching cancellation condition is not satisfied.

After having determined the success or failure of the matching cancellation condition by way of the above-described process of FIG. 5, in steps S15 to S17 of FIG. 4, the ECU 44 carries out a process corresponding to the determination.

A3. Advantages of the First Embodiment

As described above, according to the present embodiment, if at least a portion of the camera target object 100c (first object), which is detected by the camera information processor 60 (first object detector), exists on the travel path 140 of the vehicle 10 (S22 of FIG. 5: YES), and the radar target object 100r (second object), which is detected by the radar information processor 62 (second object detector), exists outside of the travel path 140 (step S24: YES), the camera target object 100c and the radar target object 100r are judged to be different objects (S25, S15: YES), even if the relative distance Dx between the camera target object 100c and the radar target object 100r is less than or equal to the threshold value Lx (step S12 of FIG. 4: YES). Consequently, even if the camera 40 mistakenly detects the position Poc of the camera target object 100c, operation of an excessive traveling control based on the mistaken detection result can be prevented.

In the first embodiment, if the camera information processor 60 (first object detector) has detected at least a portion of the camera target object 100c (first object) on the travel path 140 (step S11 of FIG. 4: YES, step S22 of FIG. 5: YES), and the radar information processor 62 (second object detector 62) has detected (refer to FIG. 3) the radar target object 100r (second object) outside of the travel path 140, for which the relative distance Dx thereof with the camera target object 100c is less than or equal to the threshold value Lx (step S12: YES), and the radar target object 100r on the travel path 140, for which the relative distance Dx with the camera target object 100c is not less than or equal to the threshold value Lx (step S12: NO), the matching unit 70 (sameness judgment unit) carries out the traveling control with respect to the radar target object 100r on the travel path 140 (step S15: YES→step S17).

In accordance with the above feature, even if the radar target object 100r outside of the travel path 140 is present in the vicinity of the camera target object 100c, at least a portion of which exists on the travel path 140 (step S12 of FIG. 4: YES), the traveling control is still performed with respect to the radar target object 100r that is on the travel path 140 and outside of the predetermined distance Lx (step S15: YES→step S17). For example, as shown in FIG. 3, if the point Por1 is outside of the predetermined distance Lx, and the point Por1 is farther from the point Poc than the point Por2, the traveling control is performed with respect to the radar target object 100r at the point Por1. Consequently, even if the camera information processor 60 mistakenly detects the position Poc of the camera target object 100c, the traveling control can appropriately be carried out with respect to the radar target object 100r on the travel path 140, which lies outside of the predetermined distance Lx with respect to the camera target object 100c.

In FIG. 3, the point Por1 is shown to be outside of the predetermined distance Lx, and the point Por1 is shown to be farther from the point Poc than the point Por2. However, it is also possible, for example, for the position of the point Por1 (preceding vehicle 102) to be inside of the predetermined distance Lx, and for the point Por1 to be farther from the point Poc than the point Por2. For example, such a situation may occur in the case that the preceding vehicle 102 comes into close proximity to the host vehicle 10, or in the case that the predetermined distance Lx is comparatively long (or if the circle 120 is large).

In such a case, if the camera information processor 60 (first object detector) has detected at least a portion of the camera target object 100c (first object) on the travel path 140 (step S22 of FIG. 5: YES), and the radar target object 100r (second object) outside of the travel path 140 and the radar target object 100r on the travel path 140, for which the relative distances Dx thereof, respectively, with the camera target object 100c are less than or equal to the threshold value Lx, are detected (step S12 of FIG. 4: YES), the matching unit 70 (sameness judgment unit) carries out a traveling control (step S15: YES→step S17) with respect to the radar target object 100r on the travel path 140, even if the relative distance Dx of the radar target object 100r outside of the travel path 140 (e.g., the radar target object 100r at the position Por2 of FIG. 3) is shorter (step S13) than that of the radar target object 100r on the travel path 140 (e.g., the radar target object 100r at the position Por1 of FIG. 3).

In accordance with the above feature, even if the relative distance Dx of the radar target object 100r outside of the travel path 140 is shorter than that of the radar target object 100r on the travel path 140, the traveling control is performed with respect to the radar target object 100r on the travel path 140. Consequently, even if the camera information processor 60 mistakenly detects the position Poc of the camera target object 100c, the traveling control can appropriately be carried out with respect to the radar target object 100r on the travel path 140, which lies inside of the predetermined distance Lx with respect to the camera target object 100c.

B. Second Embodiment

B1. Configuration (Differences from First Embodiment)

The hardware configuration of the second embodiment is the same as that of the first embodiment (see FIG. 1). Below, the same reference characters are designated with respect to the same structural elements, and detailed description of such features is omitted. In the second embodiment, the matching process (FIG. 6) that the ECU 44 performs differs from the matching process (FIG. 4) of the first embodiment.

B2. Matching Control

As noted above, in the second embodiment, the matching process (FIG. 6) that the ECU 44 performs differs from the matching process (FIG. 4) of the first embodiment. More specifically, according to the first embodiment, excluding the case in which the matching cancellation condition is not satisfied (step S15: NO), the radar target object 100r is designated as the target object 100tar without using matching (step S17). In contrast thereto, with the second embodiment, in the case that the matching cancellation condition of the first embodiment is satisfied, the target object 100tar is identified by carrying out a new matching process (the matching process is changed).

Figure 6:
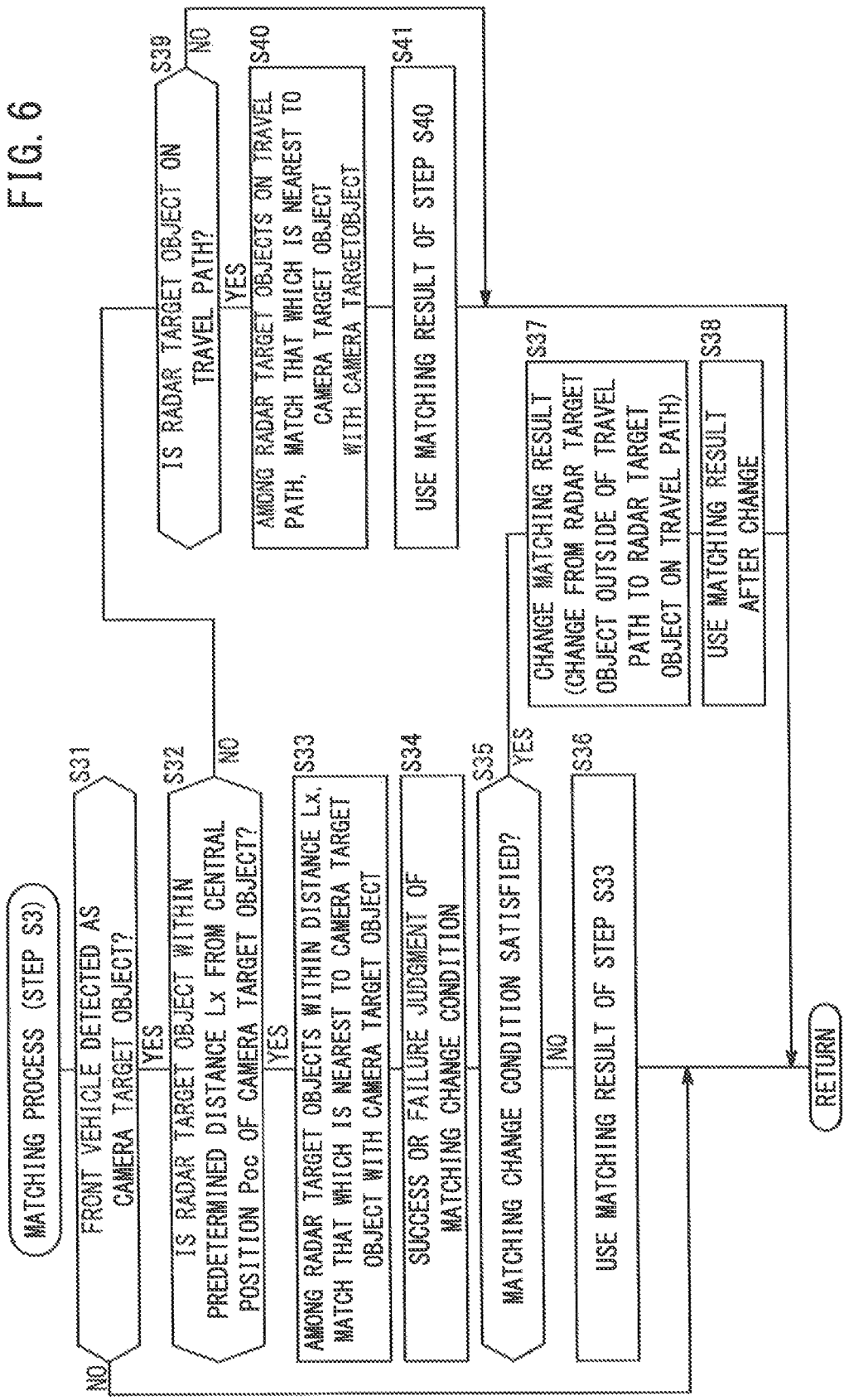
FIG. 6 is a flowchart (details of step S3 of FIG. 2) of the matching process according to a second embodiment.

FIG. 6 is a flowchart (details of step S3 of FIG. 2) of the matching process according to the second embodiment. Steps S31 to S33 of FIG. 6 are the same as steps S11 to S13 of FIG. 4.

In step S34, the ECU 44 determines the success or failure of a matching change condition. The matching change condition referred to above is a condition that corresponds to the case of mistaken detection, as was described above with reference to FIG. 3, and in this manner, is similar to step S14 of FIG. 4 and each of the steps of FIG. 5.

More specifically, in step S34, a process is carried out which is the same as steps S21 to S24 of FIG. 5. Additionally, in the case that all of the determinations of steps S21 to S24 of FIG. 5 are YES, it is determined that the matching change condition has been satisfied. Further, in the case that any one of the determinations of steps S21 to S24 of FIG. 5 is NO, it is determined that the matching change condition has not been satisfied. Stated otherwise, the process of step S34 is one in which the "cancellation condition satisfied" of step S25 of FIG. 5 is replaced by "change condition satisfied", and "cancellation condition not satisfied" of step S26 is replaced by "change condition not satisfied".

In step S35 of FIG. 6, the ECU 44 determines whether or not the matching change condition has been satisfied. In the case that the matching change condition is not satisfied (step S35: NO), then in step S36, the ECU 44 makes use of the matching result of step S33 without modification. In addition, using the longitudinal distance Lr to the radar target object 100r, and the lateral distance Dc to the camera target object 100c, the ECU 44 calculates the TTC. Step S36 can be carried out in the same manner as step S16 of FIG. 4.

In the case that the matching change condition is satisfied (step S35: YES), then in step S37, the ECU 44 changes the matching result of step S33. More specifically, instead of the radar target object 100r which is nearest to the camera target object 100c and outside of the travel path 140, among the radar target objects 100r that are on the travel path 140, that which is nearest to the camera target object 100c is selected and is matched with the camera target object 100c.

In the following step S38, the matching process of step S37 is used. In addition, using the longitudinal distance Lr to the radar target object 100r and the lateral distance Dc to the camera target object 100c, which are included in the new matching result, the ECU 44 calculates the TTC.

Returning to step S32, if the radar target object 100r does not exist within the predetermined distance Lx from the central position Poc of the detected camera target object 100c (step S32: NO), the process proceeds to step S39.

In step S39, the ECU 44 judges whether or not the radar target object 100r exists on the travel path 140 of the host vehicle 10. If the radar target object 100r exists on the travel path 140 of the host vehicle 10 (step S39: YES), the process proceeds to step S40. If the radar target object 100r does not exist on the travel path 140 of the host vehicle 10 (step S39: NO), the current process is brought to an end. In this case, the target object 100tar remains unspecified.

In step S40, the ECU 44 selects and matches with the camera target object 100c, from among the radar target objects 100r that are on the travel path 140, that which is nearest to the camera target object 100c.

In the following step S41, the matching process of step S40 is used. In addition, using the longitudinal distance Lr to the radar target object 100r and the lateral distance Dc to the camera target object 100c, which are included in the relevant matching result, the ECU 44 calculates the TTC.

B3. Advantages of the Second Embodiment

According to the second embodiment as described above, the following advantages can be offered in addition to or instead of the aforementioned advantages of the first embodiment.

According to the second embodiment, if the camera information processor 60 (first object detector) has detected at least a portion of the camera target object 100c (first object) on the travel path 140 (step S31 of FIG. 6: YES, step S22 of FIG. 5: YES), and the radar information processor 62 (second object detector) has detected (refer to FIG. 3) the radar target object 100r (second object) outside of the travel path 140, for which the relative distance Dx thereof with the camera target object 100c is less than or equal to the threshold value Lx, and the radar target object 100r on the travel path 140, for which the relative distance Dx with the camera target object 100c is not less than or equal to the threshold value Lx, the matching unit 70 (sameness judgment unit) determines that the camera target object 100c and the radar target object 100r on the travel path 140 are the same (step S35: YES→step S37).

In accordance with the above feature, even if the radar target object 100r outside of the travel path 140 is present in the vicinity of the camera target object 100c, at least a portion of which exists on the travel path 140, it is determined that the camera target object 100c and the radar target object 100r on the travel path 140 are the same. Consequently, even if the camera information processor 60 mistakenly detects the position Poc of the camera target object 100c, the traveling control can appropriately be carried out using the information of the camera target object 100c and the information of the radar target object 100r on the travel path 140, which resides outside of the predetermined distance Lx with respect to the camera target object 100c.

As was noted above with respect to the first embodiment, as shown in FIG. 3, the point Por1 is outside of the predetermined distance Lx, and the point Por1 is farther from the point Poc than the point Por2. However, it is also possible, for example, for the position of the point Por1 (preceding vehicle 102) to be inside of the predetermined distance Lx, and for the point Por1 to be farther from the point Poc than the point Por2.

In such a case, if the camera information processor 60 (first object detector) has detected at least a portion of the camera target object 100c (first object) on the travel path 140 (step S22 of FIG. 5: YES), and also detected (step S32 of FIG. 6: YES) the radar target object 100r (second object) outside of the travel path 140 and the radar target object 100r on the travel path 140, for which the relative distances Dx thereof, respectively, with the camera target object 100c are less than or equal to the threshold value Lx, the matching unit 70 (sameness judgment unit) determines that the camera target object 100c and the radar target object 100r on the travel path 140 are the same (step S35: YES→step S37), even if the relative distance Dx of the radar target object 100r outside of the travel path 140 is shorter (step S13) than that of the radar target object 100r on the travel path 140.

In accordance with the above feature, even if the relative distance Dx of the radar target object 100r outside of the travel path 140 is shorter than that of the radar target object 100r on the travel path 140 (S33 of FIG. 6), it is determined that the camera target object 100c and the radar target object 100r on the travel path 140 are the same (S35: YES→S37). Consequently, even if the camera information processor 60 mistakenly detects the position Poc of the camera target object 100c, the traveling control can appropriately be carried out using the information of the camera target object 100c and the information of the radar target object 100r on the travel path 140, which resides inside of the predetermined distance Lx with respect to the camera target object 100c.

C. Modifications

The present invention is not limited to the respective embodiments described above, and various alternative or additional arrangements may be adopted based on the content disclosed in the present specification. For example, the following arrangements may be adopted.

C1. Objects to which the Present Invention is Applicable

In the respective embodiments above, the object recognition apparatus 12 is applied to a vehicle 10 (FIG. 1). However, the present invention is not limited to this application, and may be applied to other objects. For example, the object recognition apparatus 12 may be incorporated in mobile objects such as ships, aircraft, etc. Alternatively, the object recognition apparatus 12 may be incorporated in robots, security-related monitoring apparatus, or electric home appliances. Further, the object recognition apparatus 12 need not necessarily be disposed in the vehicle 10 (mobile object) itself, but may be arranged externally of the vehicle 10 (for example, in a roadside device such as an optical beacon or the like). In this case, communications can be carried out between the vehicle 10 and the object recognition apparatus 12, and the recognition results of the object recognition apparatus 12 can be transmitted to the vehicle 10.

C2. Configuration of Object Recognition Apparatus 12

In the above embodiment, the calculation result (TTC) of the object recognition apparatus 12 is used by the object recognition apparatus 12, the driving ECU 30, the VSA ECU 32, the CMBS ECU 34, and the EPS ECU 36 (step S4 of FIG. 2). However, the calculation result (TTC) of the object recognition apparatus 12 can be used in other applications. For example, the calculation result can also be used for parking assistance of the vehicle 10.

In the above embodiment, the radar system 42 is used, which makes use of transmitted waves Wt and reflected waves Wr in the form of millimeter waves. However, the present invention is not limited to this feature. For example, from the standpoint of obtaining information Ir of the second object 100r using reflected waves Wr of the transmitted waves Wt as electromagnetic waves, a laser radar system, or a sensor such as an ultrasonic wave sensor or the like, can also be used.

According to the respective embodiments described above, the camera 40 and the radar system 42 are used in combination (see FIG. 1). However, from the standpoint of using a plurality of object detectors (at least a first object detector and a second object detector), the present invention can be applied to a configuration in which two cameras 40 (images Imc) are used, or a configuration in which two radar systems 42 are used.

C3. Control of Object Recognition ECU 44

[C3-1. Criteria for Matching]

In each of the embodiments described above, the camera target object 100c serves as a standard for carrying out matching between the camera target object 100c and the radar target object 100r. More specifically, among the radar target objects 100r, which reside within the predetermined distance Lx from the central position Poc of the camera target object 100c, that which is nearest to the camera target object 100c is matched with the camera target object 100c (step S13 of FIG. 4, step S33 of FIG. 6). However, for example, from the standpoint of not carrying out matching between the camera target object 100c and the radar target object 100r, in the case that at least a portion of the camera target object 100c exists on the travel path 140 and the radar target object 100r exists outside of the travel path 140, the invention is not limited to this feature. For example, the radar target object 100r can serve as the standard for carrying out matching between the camera target object 100c and the radar target object 100r.

[C3-2. In the Case that Mistaken Matching Occurs]

In the first embodiment, the camera information processor 60 carries out a control for the purpose of avoiding a situation of mistaken detection that a sideways oriented vehicle exists based on a pole 104 and a white line 114 (FIGS. 3 to 5). However, for example, from the standpoint of not carrying out matching between the camera target object 100c and the radar target object 100r, in the case that at least a portion of the camera target object 100c exists on the travel path 140 and the radar target object 100r exists outside of the travel path 140, the invention is not limited to this feature. For example, it is possible to avoid a situation in which a sideways oriented vehicle is mistakenly detected, based on a parked vehicle existing along the roadside of the traveling lane 110 of the host vehicle 10, and a white line 114 on the left side of the parked vehicle. Alternatively, it is possible to avoid a situation in which a sideways oriented vehicle is mistakenly detected, based on a pole 104 and the right side of the parked vehicle. The same features can be applied to the second embodiment.

[C3-3. Cancellation or Change of Matching Process]

According to the first embodiment, after the matching process has been performed once (step S13 of FIG. 4), in the case that the matching cancellation condition is satisfied (step S15: YES), the matching result is canceled (step S17). However, for example, from the standpoint of not performing matching between the camera target object 100c and the radar target object 100r, in the case that at least a portion of the camera target object 100c exists on the travel path 140 and the radar target object 100r exists outside of the travel path 140, the invention is not limited to this feature. For example, in the case that the result of step S12 is YES, the matching process of step S13 can also be performed, at a condition in which the matching cancellation condition is not satisfied (step S15: NO).

Similarly, according to the second embodiment, after the matching process has been performed once (step S33 of FIG. 6), in the case that the matching cancellation condition is satisfied (step S35: YES), the matching result is changed (step S37). However, for example, from the standpoint of not performing matching between the camera target object 100c and the radar target object 100r, in the case that at least a portion of the camera target object 100c exists on the travel path 140 and the radar target object 100r exists outside of the travel path 140, the invention is not limited to this feature. For example, in the case that the result of step S32 is YES, the matching process of step S33 can also be performed, at a condition in which the matching cancellation condition is not satisfied (step S35: NO).

According to the first embodiment, as one matching cancellation condition, the fact that the longitudinal distance Lc to the camera target object 100c resides within the range of between the threshold values THlc1 and THlc2 (step S21 of FIG. 5) is included. However, for example, from the standpoint of not performing matching between the camera target object 100c and the radar target object 100r, in the case that at least a portion of the camera target object 100c exists on the travel path 140 and the radar target object 100r exists outside of the travel path 140, the invention is not limited to this feature. For example, in step S21 of FIG. 5, only either one of the longitudinal distance Lc being greater than or equal to the threshold value THlc1 or being less than or equal to the threshold value THlc2 may be determined. Alternatively, the judgment of step S21 of FIG. 5 per se can be omitted. The same features can be applied to the second embodiment.

According to the first embodiment, as one matching cancellation condition, the fact that the longitudinal distance Lr to the radar target object 100r resides within the range of between the threshold values THlr1 and THlr2 (step S23 of FIG. 5) is included. However, for example, from the standpoint of not performing matching between the camera target object 100c and the radar target object 100r, in the case that at least a portion of the camera target object 100c exists on the travel path 140 and the radar target object 100r exists outside of the travel path 140, the invention is not limited to this feature. For example, in step S23 of FIG. 5, only either one of the longitudinal distance Lr being greater than or equal to the threshold value THlr1 or being less than or equal to the threshold value THlr2 may be determined. Alternatively, the judgment of step S23 of FIG. 5 per se can be omitted. The same features can be applied to the second embodiment.

[C3-4. Determination that at Least a Portion of the Camera Target Object 100c is on the Travel Path 140 (Step S22 of FIG. 5)]

According to the first embodiment, for judging whether or not at least a portion of the camera target object 100c is on the travel path 140, it is determined whether or not the central position Poc of the camera target object 100c resides within a range of ±THpoc from the central locus 130 of the host vehicle 10 (S22 of FIG. 5). However, for example, from the standpoint of determining whether or not at least a portion of the camera target object 100c exists on the travel path 140, the invention is not limited to this feature. For example, the lane 110 in which the host vehicle 10 is traveling may be detected based on the peripheral image Imc, and whether or not at least a portion of the camera target object 100c exists on the travel path 140 may be determined by whether or not at least a portion of the camera target object 100c resides on the lane 110. The same features can be applied to the second embodiment.

[C3-5. Determination that the Radar Target Object 100r is Outside of the Travel Path 140 (Step S24 of FIG. 5)]

According to the first embodiment, for judging whether or not the radar target object 100r is outside of the travel path 140, it is determined whether or not the central position Por of the radar target object 100r resides outside of a range of ±THpor from the central locus 130 of the host vehicle 10 (S24 of FIG. 5). However, for example, from the standpoint of determining whether or not the radar target object 100r is outside of the travel path 140, the invention is not limited to this feature. For example, the lane 110 in which the host vehicle 10 is traveling may be detected based on the peripheral image Imc, and whether or not the radar target object 100r is outside of the travel path 140 may be determined by whether or not the radar target object 100r is outside of the lane 110. The same features can be applied to the second embodiment. The present invention is not limited to the above-described embodiment, but various modified or additional structures may be included therein without departing from the scope and essential gist of the present invention as set forth in the appended claims.

What is claimed is:

1. An object recognition apparatus comprising:
a camera configured to detect a first object existing in a traveling direction of a vehicle;
a radar configured to detect a second object existing in the traveling direction; and
a processor configured to provide a sameness judgment unit configured to judge whether the first object and the second object are the same, by comparing a position of the first object and a position of the second object;
wherein:
the sameness judgment unit sets a threshold value for a relative distance between the first object and the second object, for judging whether or not the first object and the second object are the same;
if at least a portion of the first object exists on a travel path of the vehicle, and the second object exists outside of the travel path, the sameness judgment unit judges that the first object and the second object are different objects, even if the relative distance is less than or equal to the threshold value, and
in response to the judgment of the sameness judgment unit, the processor is further configured to execute driving support including at least one of velocity control, stability assist control, collision mitigation brake control, and steering assist control.

2. The object recognition apparatus according to claim 1, wherein if the camera has detected at least a portion of the first object on the travel path, and the second object outside of the travel path and the second object on the travel path, for which the relative distances thereof, respectively, with the first object are less than or equal to the threshold value, are detected, the processor executes the driving support with respect to the second object on the travel path, even if the relative distance of the second object outside of the travel path is shorter than that of the second object on the travel path.

3. The object recognition apparatus according to claim 1, wherein if the camera has detected at least a portion of the first object on the travel path, and the radar has detected the second object outside of the travel path, for which the relative distance thereof with the first object is less than or equal to the threshold value, and the second object on the travel path, for which the relative distance with the first object is not less than or equal to the threshold value, the processor executes the driving support with respect to the second object on the travel path.

4. The object recognition apparatus according to claim 1, wherein if the camera has detected at least a portion of the first object on the travel path, and the second object outside of the travel path and the second object on the travel path, for which the relative distances thereof, respectively, with the first object are less than or equal to the threshold value, are detected, the sameness judgment unit determines that the first object and the second object on the travel path are the same, even if the relative distance of the second object outside of the travel path is shorter than that of the second object on the travel path.

5. The object recognition apparatus according to claim 1, wherein if the camera has detected at least a portion of the first object on the travel path, and the radar has detected the second object outside of the travel path, for which the relative distance thereof with the first object is less than or equal to the threshold value, and the second object on the travel path, for which the relative distance with the first object is not less than or equal to the threshold value, the sameness judgment unit determines that the first object and the second object on the travel path are the same.

* * * * *